Dec. 4, 1956 F. T. SMITH 2,772,615
REVERSIBLE DISC PLOW

Filed Nov. 29, 1952 2 Sheets-Sheet 1

INVENTOR.
FRED T. SMITH
BY
ATTORNEY

Dec. 4, 1956 F. T. SMITH 2,772,615
REVERSIBLE DISC PLOW

Filed Nov. 29, 1952 2 Sheets-Sheet 2

INVENTOR.
FRED T. SMITH
BY
*W. A. Morey*
ATTORNEY

United States Patent Office 2,772,615
Patented Dec. 4, 1956

2,772,615

REVERSIBLE DISC PLOW

Fred T. Smith, Golden, Colo., assignor, by mesne assignments, to The Calkins Manufacturing Company Application November 29, 1952, Serial No. 323,189

4 Claims. (Cl. 97—31)

This invention relates to plows, and particularly to improvements in reversible disc plows incorporating means for working the sub-soil. It is particularly useful when employed in conjunction with a tractor-implement linkage of the type defined in my co-pending application, Serial Number 316,280, filed October 22, 1952.

One of the primary objects of this invention is to provide a reversible disc plow which, by virtue of simple, sturdy construction, may be fabricated at low cost, but which is nevertheless durable, highly efficient, and easily manipulated.

Another important object of this invention is to provide a reversible disc plow structure incorporating novel sub-soil working means adapted to adsorb and neutralize the side thrust developed by the plow discs and to override obstructions without damage.

A further important object of this invention is to provide a disc plow structure constructed and arranged in such manner as to vibrate during its passage through the ground, thereby aiding the passage of the plow and associated equipment through the soil.

Other objects, as well as the several advantages of this invention, will be disclosed in the course of the following description, and in the appended drawings, in which.

In brief, my plow employs a rigid frame suitable for attachment to a tractor or the like at three triangularly spaced points, or in other suitable manner. A tubular plow beam is pivotally secured to the rearward portion of the frame for movement about an upright axis, the point of attachment preferably being forwardly of the center of the plow beam. Pendant plow disc supports are secured to the plow beam and rotatably support conventional plow discs. An arm is also pivotally secured to the plow beam rearwardly of the plow beam center and supports near its rear extremity a pair of pendant leaf springs arranged for flexing action only in the direction of movement. A sub-soiling fin is pivotally secured to the lower extremities of these springs and is arranged to penetrate into sub-soil. Stops are arranged on the plow beam to limit the angular relationship between the arm and the beam.

Since the arm is freely pivoted, it will align itself with the direction of movement. The plow beam, because of its side thrust, will swing until the stops engage the arm, which resists further movement. This strain is transmitted through the leaf springs to the sub-soiling fin, which penetrates the sub-soil sufficiently to absorb the thrust. By proper shaping of the fin and positioning the. fin with respect to a horizontal line, a downward force may be developed which tends to draw the plow into the ground, thereby eliminating the necessity of high unit weight. Because of the spring mounting, the fin is capable of riding over obstructions without damage. Additionally, however, the vibration of the fin, combined with the vibration of the discs and supports, tends to move the device through the soil with less effort than would otherwise be required.

Figure 1:
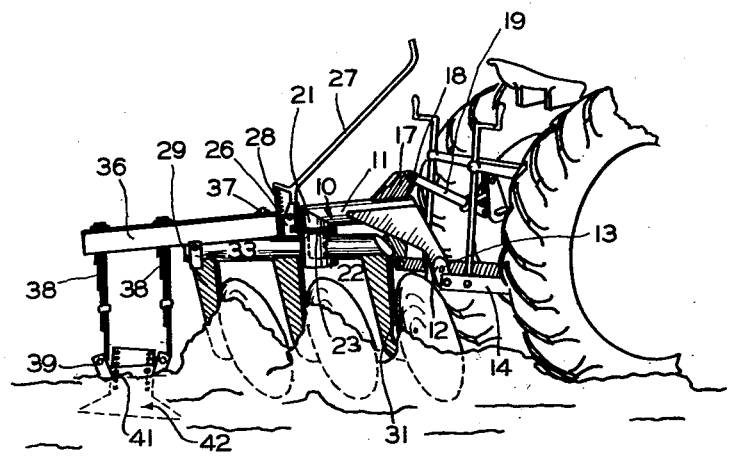
Fig. 1 is a perspective elevation of my invention applied to a prime mover, such as a tractor.
Figure 3:
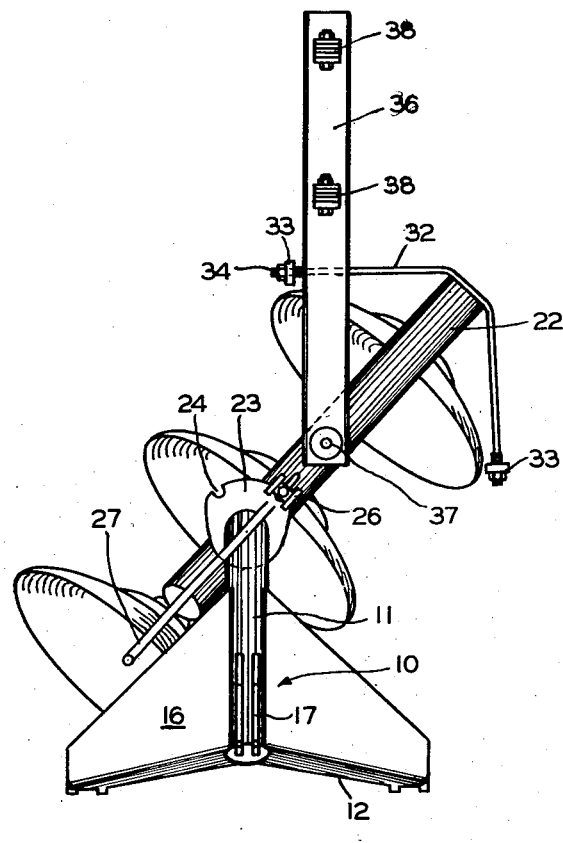
Fig. 3 is a perspective plan view of the plow illustrated in Fig. 1.
Figure 4:
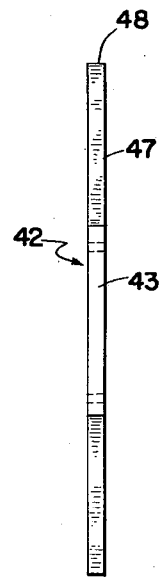
Fig. 4 is a plan view of the sub-soiling blade.

For a more detailed description, reference is made to Figs. 1 and 3, in which I have disclosed a frame, generally designated 10, having a horizontal rearwardly extending tube 11. Downwardly diverging arms 12 are fixed at their upper ends to the forward portion of the tube 11 and define in their extremities means, such as openings 13, for attachment to tractor draft arms 14. Gusset plates 16 are preferably employed to reinforce the arms 12 and the tube 11. Spaced ears 17 project upwardly from the forward extremities of the tube 11 and define means 18 adapted to receive another tractor draft arm 19.

An upright member 21 extends downwardly from the rearward extremity of the frame 10 and pivotally engages a generally horizontal plow beam 22 at a point preferably somewhat ahead of the plow beam midpoint. A collar 23 is fixed to the member 21 and includes a plurality of spaced notches, indicated at 24, by means of which the beam 22 may be restrained in a predetermined angular relationship to the frame 10. A bracket 26 is fixed to the beam 22 and pivotally supports a lever 27 in such manner that arcuate movement of the upper portion of the lever will engage or disengage the lower portion of the lever from the notches 24. A spring 28 continuously urges the lever into engagement with these notches.

A plurality of relatively light members 29 of U shaped cross section are fixed to the plow beam and extend downwardly towards the soil, defining at their lower extremities conventional pivot supports (not shown) for plow discs 31. The members 29 are intentionally made somewhat resilient and are applied to a beam 22, preferably of tubular construction, to encourage vibration of low amplitude as the discs 31 and drawn through the soil. Forwardly diverging arms 32 are secured to the rear portion of the plow beam 22 and terminate in upright ears 33 through which threaded steps 34 extend.

An arm 36 is pivotally secured to the plow beam 22 rearwardly from the pivot 21, as by an upright pin 37. The arrangement of the arm 36 is such that it can pivot freely about the pin 37, except insofar as limited by the stops 34, which are arranged in the arcuate path of the arm 36, thereby limiting the maximum angular relationship which can exist between the beam 22 and the arm 36.

A pair of conventional leaf springs 38 are secured in conventional manner near their thick upper ends to the arm 36 in such manner as to permit flexing only in an upright plane extending through the arm 36, which in turn extends in the direction of movement. The lower extremities of the spring 38 are pivotally secured, as by conventional shackles, to a cross bar 39 defining spaced openings adapted to receive bolts 41. A sub-soiling blade, generally designated 42, preferably formed from a single, flat, relatively thin plate, is provided with a neck 43 defining a plurality of spaced openings 44 through which the bolts 41 extend. The blade 42 is intended to penetrate the sub-soil and includes a lower portion having a bottom 46 normal to the axis of the neck 43 and a forwardly and downwardly sloping edge 47 defining in conjunction with the bottom 46 a point 48 adapted to aid in the penetration of the sub-soil. The actual thickness of the blade 42 will, of course, vary to some extent with the size of the plow, but since it is stressed during operation, it is preferably not less than ¼" thick. It need not, however, in a majority of cases exceed ½".

In operation, the draft arms 14 and 19 are pivotally fastened to the frame in the manner shown in Fig. 1. The operator depresses lever 27, thereby disengaging it from the notches 24 on the collar 23 and swings the beam 22 to the desired position. The lever 27 is then reengaged with the proper notch 24; this ordinarily is accomplished while the plow is elevated. The sub-soiling blade 42 is usually inclined somewhat forwardly, as indicated in Fig. 1, and is arranged to penetrate the soil to a level below that worked by the plow discs 31. Both the depth of penetration and the angular disposition of the blade 42 may be adjusted by the bolts 41.

After the plow is lowered and the tractor set in motion, the discs 31 are drawn through the soil in conventional manner. The side thrust developed by this movement is transmitted by the discs through the members 29 to the beam 22. This thrust or torque is not, however, transmitted from the beam 22 to the frame 10, since the stops 34 on the beam 22 engage the arm 36, which through the action of the blade 42 aligns itself with the direction of movement, usually parallel to the tube 11. The sub-soiling blade, having penetrated the soil below the level of the discs 31, cannot move laterally and the thrust is therefore absorbed by the blade 42. It is important to note that springs 38 cannot flex laterally but only in the direction of movement, and are thereby capable of transmitting this side thrust to the blade.

Figure 2:
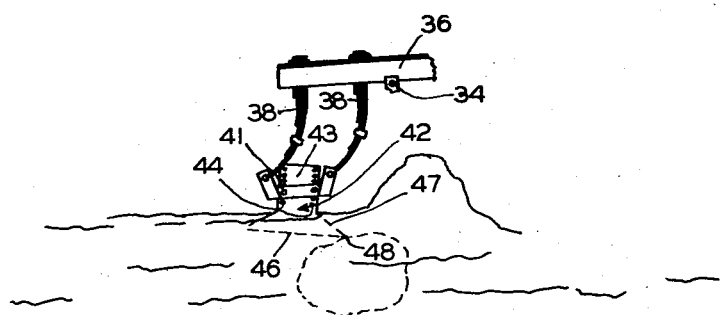
Fig. 2 is a partial elevation of a novel sub-soiling fin utilized in my invention.

Since the edge 47 of the blade 42 is inclined forwardly and downwardly and engages firm soil, it tends to move downwardly into the sub-soil, thus pulling the arm 36 downwardly which in turn holds the discs 31 in firm contact with the soil. In the event the sub-soiling blade 42 encounters an obstruction, as illustrated in Fig. 2, the springs 38 will flex rearwardly and upwardly, allowing the blade 42 to ride over the obstruction without endangering the plow. The blade 42 also vibrates during its passage through the soil, this vibration being transmitted to the beam 22 and to the discs 31, thereby reducing the effort required to draw the plow and aiding in freeing both the discs 31 and the blade 42 of the adhering soil. This vibration is, of course, supplemented by the vibration generated by the discs 31 acting through the resilient support members 29.

Upon reaching the end of the field, the plow may be elevated in conventional manner and reversed in position by operation of the lever 27. It is not necessary to manually control the position of the arm 36 in any manner, since alignment of the arm is automatic when the plow is in operation. It will be found that the side thrust developed by the discs is so effectively absorbed by the blade 42 in the manner described that little difficulty will be encountered in maneuvering the tractor or in maintaining a straight line of movement.

It will be appreciated that the foregoing detailed description is intended to describe only a preferred embodiment of my invention. In some instances, a single leaf spring 38 may be adequate for the intended purpose, particularly if arranged to extend rearwardly and downwardly rather than vertically, as shown. Other forms of springs may be substituted to accomplish the intended purpose, it being essential, however, that the blade 42 be resiliently movable only in an upright plane through the arm 36 and not laterally, and that the downward force be sufficient to drive the blade 42 into and through the sub-soil. If desired, conventional adjusting means may also be employed for more accurately positioning the beam 22 with respect to the frame 10. These and similar obvious modifications are therefore to be considered as within the scope of this invention.

I claim:

1. A reversible disc plow comprising a draft frame adapted for attachment to and support by a tractor, a generally horizontal plow beam pivoted between its ends to the frame for movement about an upright axis, plow discs carried by the beam for engagement with the soil, a generally horizontal arm freely pivoted to the beam for unrestricted movement about an upright axis, adjustable stop means on the beam limiting the maximum angle between the beam and the arm and transmitting side thrust from the beam to the arm, a vertical spring arm resilient only in an upright plane extending through the horizontal arm and projecting downwardly from said horizontal arm, and a soil penetrating sub-soiling blade fixed to the lower extremity of the spring arm, said sub-soiling blade being substantially flat, upright and having a leading soil penetrating edge sloping forwardly and downwardly in the direction of movement.

2. A reversible disc plow comprising a draft frame adapted for support by a tractor, a generally horizontal plow beam pivotally secured forwardly of its center to the rear portion of the frame for movement about an upright axis, pendant resilient members fixed to the beam, plow discs journaled on said members for engagement with the soil, a rearwardly projecting arm pivotally secured to the rearward portion of the beam for free swinging movement, adjustable stops carried by the beam limiting arcuate movement between the beam and arm and transmitting side thrusts from the beam to the arm, a sub-soiling blade rearwardly of the plow beam disposed and arranged for soil penetration, said sub-soiling blade being substantially flat, upright and having a leading soil penetrating edge sloping forwardly and downwardly in the direction of movement, and leaf spring means resilient only in an upright plane extending through said arm, said leaf spring means being fixed at one end to said arm and extending downwardly therefrom and secured at the opposite end to said sub-soiling blade whereby said blade transmits side thrust from the plow beam in either direction to the soil.

3. A reversible disc plow comprising a draft frame, a generally horizontal plow beam, plow discs carried by the beam for engagement with the soil, a rearwardly projecting arm, first upright pivot means securing the beam to the frame, second upright pivot means rearwardly of the first pivot means securing the arm to the beam for free swinging movement in a generally horizontal plane, adjustable stops on the beam in the path of the arm disposed for transmitting side thrust from the beam to the arm, a pair of downwardly projecting leaf springs, each fixed near one end to the arm and flexible only in an upright plane parallel to the direction of movement and a sub-soiling blade pivotally secured to the lower ends of said springs and projecting downwardly beyond the lower extremities of the plow discs for penetration into the soil, said sub-soiling blade being substantially flat, upright and having a leading soil penetrating edge sloping forwardly and downwardly in the direction of movement.

4. A reversible disc plow comprising a draft frame adapted to be supported by a tractor, a generally horizontal plow beam pivotally secured forwardly of its center to the rear portion of said frame for movement about an upright axis, plow discs on the beam for engagement with the soil, a rearwardly projecting horizontal arm freely pivoted to the rearward portion of the beam, adjustable stops carried by the beam limiting arcuate movement between the beam and the arm, a vertical spring arm comprising a member rigid in a transverse plane and resilient only in an upright plane extending through said horizontal arm, said member being secured to said arm and extending downwardly therefrom, and a substantially flat upright sub-soiling blade disposed for soil penetration and having a soil penetrating edge sloping forwardly and downwardly in the direction of movement, said blade being fixed to the lower extremity of said vertical spring arm, whereby side thrust of the plow discs is transmitted to the sub-soiling blade through said horizontal arm and stops.

References Cited in the file of this patent

UNITED STATES PATENTS

| | | |
|---|---|---|
| 548,590 | Poole | Oct. 22, 1895 |
| 698,081 | Turner | Apr. 22, 1902 |
| 975,544 | Lindsey | Nov. 15, 1910 |
| 1,194,720 | Brown | Aug. 10, 1915 |
| 1,831,576 | Petersen | Nov. 10, 1931 |
| 2,084,629 | Corviello | June 22, 1937 |
| 2,195,515 | Ferguson | Apr. 2, 1940 |
| 2,195,516 | Ferguson | Apr. 2, 1940 |
| 2,600,359 | Corviello | June 10, 1952 |
| 2,697,973 | Silver et al. | Dec. 28, 1954 |

FOREIGN PATENTS

| | | |
|---|---|---|
| 435,234 | Germany | Oct. 9, 1926 |